US012560117B2

(12) United States Patent
Ari

(10) Patent No.: US 12,560,117 B2
(45) Date of Patent: Feb. 24, 2026

(54) TURBO MACHINE

(71) Applicant: Bayram Ari, Istanbul (TR)

(72) Inventor: Bayram Ari, Istanbul (TR)

( * ) Notice: Subject to any disclaimer, the term of this patent is extended or adjusted under 35 U.S.C. 154(b) by 0 days.

(21) Appl. No.: 18/871,835

(22) PCT Filed: Sep. 16, 2022

(86) PCT No.: PCT/TR2022/050998
§ 371 (c)(1),
(2) Date: Dec. 5, 2024

(87) PCT Pub. No.: WO2023/244192
PCT Pub. Date: Dec. 21, 2023

(65) Prior Publication Data
US 2025/0347246 A1    Nov. 13, 2025

(51) Int. Cl.
*F02C 6/06*      (2006.01)
*F02C 3/04*      (2006.01)

(52) U.S. Cl.
CPC ................. *F02C 6/06* (2013.01); *F02C 3/04* (2013.01); *F05D 2220/72* (2013.01)

(58) Field of Classification Search
CPC ........... F02C 6/06; F02C 3/04; F05D 2220/72
See application file for complete search history.

(56) References Cited

U.S. PATENT DOCUMENTS

| | | | | |
|---|---|---|---|---|
| 4,984,432 A * | 1/1991 | Corey | ..................... | F02G 1/043 |
| | | | | 417/69 |
| 5,537,822 A * | 7/1996 | Shnaid | ...................... | F02C 6/16 |
| | | | | 60/659 |
| 5,680,764 A | 10/1997 | Viteri | | |
| 5,704,209 A * | 1/1998 | Bronicki | .................. | F02C 1/04 |
| | | | | 60/682 |
| 6,167,706 B1 * | 1/2001 | Bronicki | ................... | F02C 3/28 |
| | | | | 60/671 |
| 6,237,337 B1 * | 5/2001 | Bronicki | ................ | F03G 6/067 |
| | | | | 60/39.182 |
| 8,136,354 B2 * | 3/2012 | Havel | ....................... | F01K 3/00 |
| | | | | 60/659 |
| 8,695,360 B2 * | 4/2014 | Enis | ......................... | C02F 1/22 |
| | | | | 62/530 |
| 9,638,068 B2 * | 5/2017 | Sinatov | .................. | F25J 1/0201 |
| 9,816,490 B2 * | 11/2017 | Conlon | ................. | F22B 1/006 |
| 10,473,029 B2 * | 11/2019 | Conlon | ................... | F01K 23/10 |
| 11,137,169 B2 * | 10/2021 | Buscheck | .......... | F28D 20/0052 |
| 11,905,857 B2 * | 2/2024 | Spadacini | ................ | F01K 3/18 |
| 2004/0003592 A1 | 1/2004 | Mteri et al. | | |

(Continued)

FOREIGN PATENT DOCUMENTS

| | | | | |
|---|---|---|---|---|
| CN | 105370409 A | | 3/2016 | |
| CN | 111512096 B | * | 3/2022 | ............. F24D 18/00 |

(Continued)

*Primary Examiner* — Jesse S Bogue
(74) *Attorney, Agent, or Firm* — Bayramoglu Law Offices LLC

(57) ABSTRACT

A two-cycle turbo machine (gas turbine cycle and steam turbine cycle) operating at atmospheric air temperature is provided. The turbo machine operates with the temperature of the air in the atmosphere instead of fossil fuels in order to zero the emission of toxic gases such as CO, $CO_2$ and $NO_x$ in nature and does not require any other fuel.

7 Claims, 6 Drawing Sheets

(56)                References Cited

U.S. PATENT DOCUMENTS

| | | | | |
|---|---|---|---|---|
| 2011/0023509 | A1* | 2/2011 | Gardiner | B60H 1/00435 |
| | | | | 62/133 |
| 2013/0147197 | A1* | 6/2013 | Goebel | F03G 6/114 |
| | | | | 60/659 |
| 2015/0113940 | A1* | 4/2015 | Sinatov | F01K 25/08 |
| | | | | 60/659 |
| 2021/0025372 | A1 | 1/2021 | Dubovitskiy | |

FOREIGN PATENT DOCUMENTS

| | | | | | |
|---|---|---|---|---|---|
| EP | 0267992 | A1 | | 5/1988 | |
| EP | 3075985 | A1 | | 10/2016 | |
| FR | 2500883 | A1 | * | 9/1982 | F03G 6/074 |
| WO | 2013073972 | A1 | | 5/2013 | |
| WO | 2019094941 | A1 | | 5/2019 | |

* cited by examiner

TURBO MACHINE

CROSS REFERENCE TO THE RELATED APPLICATIONS

This application is the national phase entry of International Application No. PCT/TR2022/050998, filed on Sep. 16, 2022, which is based upon and claims priority to Turkish Patent Application No. 2022/010075, filed on Jun. 16, 2022, the entire contents of which are incorporated herein by reference.

TECHNICAL FIELD

The invention relates to a two-cycle turbo machine (gas turbine cycle and steam turbine cycle) operating at atmospheric air temperature.

BACKGROUND

Turbo machines are machines with rotating blades that convert fluid movement into useful power. Today, there are power systems that enable many machines to operate. Power systems generally use petrol, diesel, fuel oil, natural gas, LPG, coal and nuclear fuels as fuel sources. These fuel types damage the environment. Therefore, a power system that utilises atmospheric air is of great importance.

In the United States patent document numbered U.S. Pat. No. 5,680,764A, which is in the known state of the prior art, low or no pollution-free engine is mentioned in providing power for vehicles or other power applications. The engine has an air inlet that collects air from the surrounding environment. The air is compressed in several compression stages with intercoolers between the compressors. The air is then purged of components with a relatively high liquefaction in a cleaner and then expanded in a turboexpander, which allows the air to be cooled close to air liquefaction temperatures. The air is then passed through a trimmer that removes nitrogen.

In the United States patent document numbered US2004003592A1, which is in the known state of the prior art, it is mentioned that there is provided a low or no pollution-free engine for providing power in vehicles or other power applications. The engine has an air inlet that collects air from the surrounding environment. Some of the nitrogen in the air is removed. The remaining gas contains mostly oxygen, which is then directed to a gas generator.

In the European patent document numbered EP3075985A1, which is in the known state of the prior art, the turbo machine is mentioned. This turbo machine includes a compressor configured to create a compressed air stream exiting the outlet section and compressing the air received at the inlet section. A combustion chamber is operatively connected to the compressor and the combustion chamber receives the compressed air flow. A turbine is operatively connected to the combustion chamber and the turbine receives the combustion gas flow in the combustion chamber. A cooling system is operatively connected to the turbine housing. The cooling system includes a plurality of heat pipes in thermal interaction with and connected to the turbine housing.

In the Chinese patent document numbered CN105370409A, which is in the known state of the prior art, a turbo machine system including at least one compressor part, a turbine part operatively connected to the compressor part, and at least one combustion chamber fluidly connected to the compressor part and turbine part is mentioned. It includes elements such as turbine, compressor, inlet of surrounding air, steam turbine, heat exchanger.

When the existing studies in the prior art were examined, it was necessary to realise a turbo machine that operates with the temperature of the air in the atmosphere instead of fossil fuels and does not require any other fuel in order to reduce the emission of toxic gases such as CO, $CO_2$ and $NO_x$ in nature.

SUMMARY

The object of this invention is to realise a turbo machine that operates with the temperature of the air in the atmosphere instead of fossil fuels and does not require any other fuel in order to reduce the emission of toxic gases such as CO, $CO_2$ and $NO_x$ in nature.

Another object of the invention is to realise a turbo machine for generating electricity when solar panels cannot generate electricity when there is no sun, or when electricity cannot be generated from wind energy when there is no wind.

Another object of this invention is the realisation of a turbo machine that allows rain to fall.

BRIEF DESCRIPTION OF THE DRAWINGS

The turbo machine realised to achieve the objects of the present invention is shown in the accompanying figures.

These figures.

Figure 1:
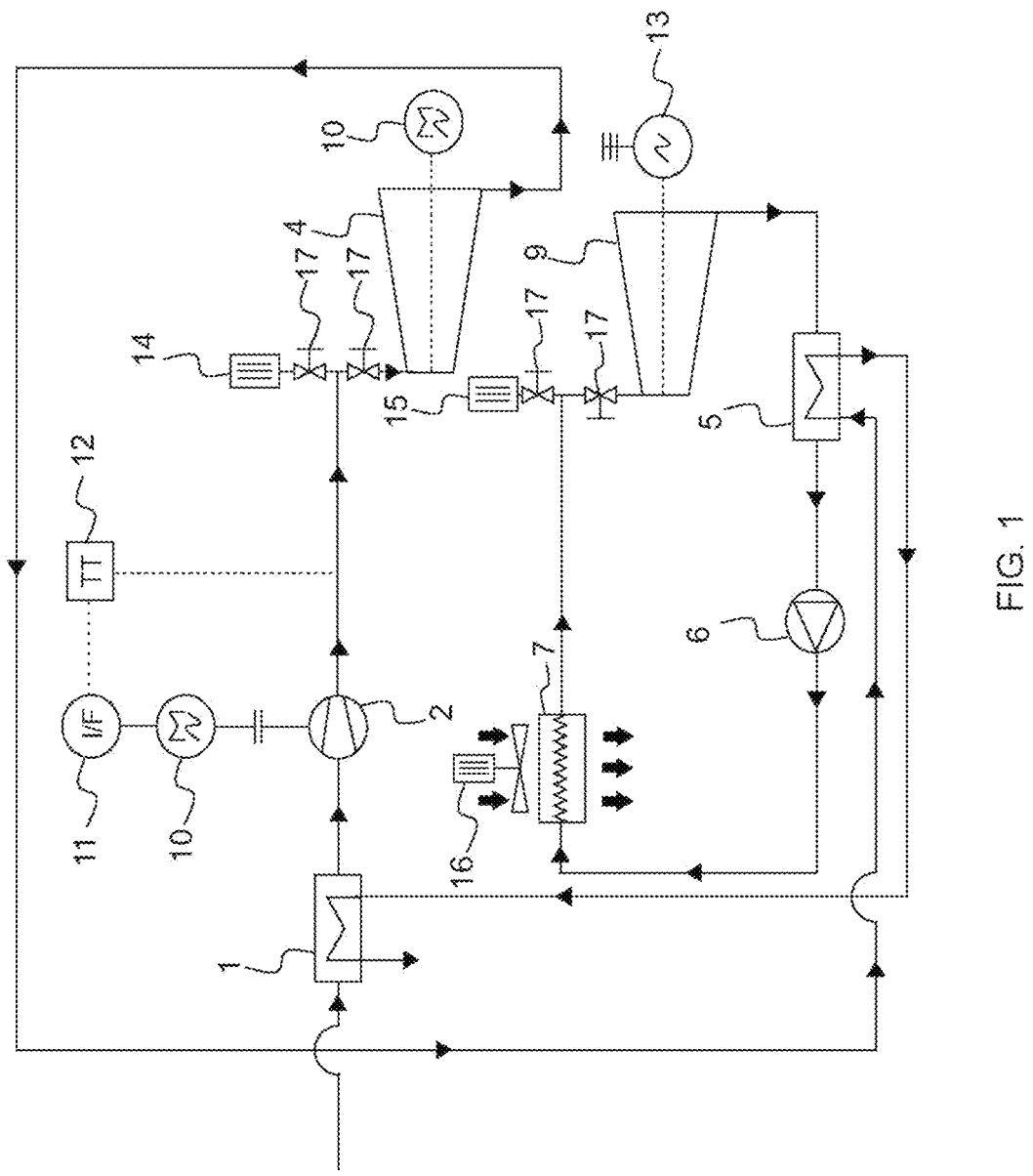
FIG. 1: The subject of the invention is the schematic view of the turbo machine used in land, sea, lake and river.
Figure 2:
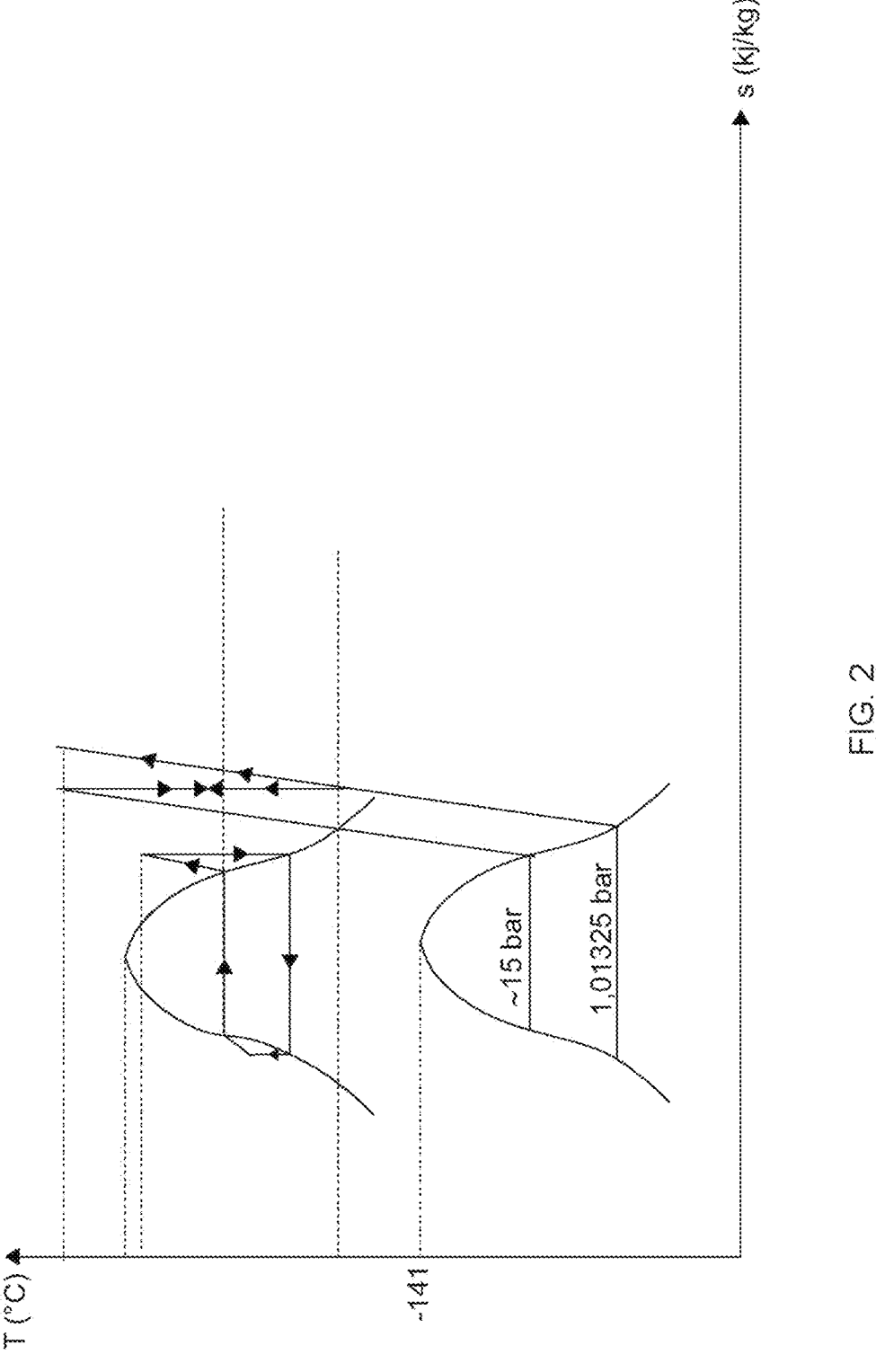
FIG. 2: The subject of the invention is the view of the entropy-temperature graph of the use of the turbo machine on land, sea, lake and river.

The parts in the figures are numbered one by one and the equivalents of these numbers are given below.

1. Heat exchanger
2. Compressor
3. Cooler
4. Gas turbine
5. Condenser
6. Pump
7. Heater I
8. Heater II
9. Steam turbine
10. Electric motor
11. Current frequency changer
12. Transmitter
13. Alternator
14. Tube I
15. Tube II
16. Ventilator
17. Valve
18. Turbine III
19. Control system

DETAILED DESCRIPTION OF THE EMBODIMENTS

The invention relates to a turbo machine which is operated by the atmospheric air temperature and does not require any other fuel, and includes the following parts:

heat exchanger (1), which is located in the machine and provides cooling of the atmospheric air, compressor (2) connected to the heat exchanger (1), which compresses the cold air to a pressure of approx. 15 bar, gas turbine (4) connected to tube I (14) and enabling the air to perform work, a condenser (5) connected to the gas turbine (4) and condensing the refrigerant R134a from the gas turbine (4), pump (6) connected to the condenser (5) and used to increase the pressure of the liquid coming out of the condenser (5), heater I (7) for heating the liquid coming out of the pump (6) to atmospheric temperature, steam turbine (9), in which the compressed air from heater I (7) in conjunction with heater I (7) is used to drive the steam turbine (9), electric motor (10) connected to the gas turbine (4) and used to compensate for the losses of the compressor (2) and the losses of the gas turbine (4), current frequency changer (11), which is connected to the electric motor (10) and prevents the compressor (2) from overheating, transmitter (12), which is connected to the current frequency changer (11) and enables the current value to be adjusted, alternator (13), which is connected to the steam turbine (9) and provides energy generation, ventilator (16) connected to the heater I (7) and heating the air.

The invention concerns a method of operation of a turbo machine which is fueled by the temperature of atmospheric air and does not require any other fuel, and includes the following steps:

cooling of atmospheric air by heat exchanger (1), compression of the cooled air by the compressor (2) to a pressure of approx. 15 bar, the compressed and heated air is then transmitted to the gas turbine (4), transmission of air from the gas turbine (4) to the condenser (5), compression of the liquid coming out of the condenser (5) with the help of the pump (6), the liquid coming out of the pump (6) is heated to atmospheric temperature by the heater I (7), heated and pressurised air enters the steam turbine (9) and does work by expanding.

The subject of the invention is a turbo machine which operates with atmospheric air temperature. The machine consists of a gas turbine (4) and a steam turbine (9). Therefore, it is a two-cycle machine.

Gas turbine (4) cycle: The cold air cooled from the heat exchanger (1) enters the compressor (2). The cold air is compressed in the compressor (2) to a pressure of approx. 15 bar. The compressed and heated air enters the gas turbine (4). The gas turbine (4) ideally fulfils the work of the compressor (2). Unmet work losses are supplied by the steam turbine (9). The expanding air in the gas turbine (4) drops to about 80 K. The exhaust from the gas turbine (4) goes to the steam turbine (9) condenser (5) where the steam engine fluid R134a is condensed. Different suitable fluids can be used instead of R134a fluid The air coming out of the condenser (5) heats up a little and enters the heat exchanger (1) and is discharged from the exhaust. Thus, the gas turbine (4) cycle is completed. The outlet air of the gas turbine (4) condenses the fluid of the steam turbine (9). Thus, the fluid is condensed in the condenser (5) in the steam turbine (9) circuit. (FIG. 1)

To condense 1 kg of refrigerant;

$$1 \text{ kg} * (\text{inlet enthalpy of refrigerant} - \text{outlet enthalpy of refrigerant}) =$$
$$m \text{ kg}$$

The formula giving the amount of air circulating in the gas turbine circuit corresponding to 1 kg R134a is given below.

$$1 \text{ kg } R134a \times (h_{10} - h_2) = m \text{ (kg)} \times (h_5 - h_4) \qquad \text{(Formula I)}$$

From the formula, the m information is obtained and the amount of air to be circulated in the gas turbine (4) circuit is found. Pressure and temperature values are found with the formula;

$$\frac{T_3}{T_2} = \left(\frac{P_3}{P_2}\right)^{\frac{k-1}{k}} \qquad \text{(Formula II)}$$

which is used in adiabatic compression and expansion where there is no difference in $C_p$ specific heats. Here k=1,4, $P_2$ atmospheric pressure is 1,01325 bar and $P_3$ pressure is decreased to approximately 80 K at the end.

Compressor (2) outlet pressure is the turbine inlet pressure. There is little change in $C_p$ in these pressure and temperature ranges. In the gas turbine (4) circuit, the gas turbine (4) ideally provides the work of the compressor (2). The electric motor (10) is switched on to provide the losses of the compressor (2) and the losses of the gas turbine (4). Therefore, the system operates in regime.

The electric motor (10) obtains its energy from the steam turbine (9). Tube I (14) is used for initial progress. When the system starts to operate regularly, tube I (14) is filled and valve (17) is closed. It is prepared for a 2nd stop.

The compressor (2) heats up too much when it reaches 15 bar or above. In order to prevent this heating, a current frequency changer (11) system enters the circuit. The outlet temperature of the compressor (2) is set to a certain state. In initial operation, the temperature transmitter (12) at the end of the compressor (2) switches the frequency and adjusts the current. The compressor (2) prevents the engine from being overstressed and overheating. It enters the regime state and then the steam turbine (9), heater I (7), condenser (5) and pump (6) are activated. The system operates at full load. The cold air coming out of the condenser (5) is slightly below the condensing temperature and goes to the heat exchanger (1). It heats up to ambient temperature in the heat exchanger (1). Thus, the gas turbine (4) circuit is completed.

Steam turbine (9) cycle: The liquid R134a from the condenser (5) is pumped to a pressure of 200 kPa by means of pump (6). The liquid coming out of the pump (6) is heated to atmospheric temperature by heater I (7). The heated and pressurised air enters the steam turbine (9) and does work by expanding. The vapour coming out of the steam turbine (9) enters the condenser (5) again and thus the steam turbine (9) circuit is completed.

After the R134a refrigerant is condensed with cold air in the condenser (5), it is pumped to heater I (7) by means of pump (6), heater I (7) is heated to ambient temperature by means of a fan (16). This heating is achieved by forced convection heat transfer. The air speed blown by the fan (16) must be greater than or equal to 5 m/s. Otherwise, the water vapour in the air may condense on the heater I (7) pipes. For this reason, it must be dragged quickly over the pipe before condensation occurs. Tube II (15), like tube I (14), is used for initial progress. After the system has made progress, the valve (17) of tube I (14) and tube II (15) is closed. It prepares for a 2nd stop. (FIG. 1)

The cold air from the heat exchanger (1) is compressed by the compressor (2) until it reaches a pressure of about 15 bar and adiabatic state (Q=0). Since there is a hot air inlet at the first start-up, the current and frequency changer (11) will be activated. The engine gradually heats up with the temperature received from the temperature transmitter (12) at the output of the compressor (2). Air compressed to 15 bar pressure enters. The air taken from the outlet temperature of the compressor (2) heats the heater II (8) in the steam turbine (9) circuit by means of a heat exchanger (1). This process is applicable to a different embodiment of the invention for use in aircraft.

The main operation of the subject of the invention turbo machine is performed by the steam turbine (9). The steam turbine (9) rotates and drives the alternator (13). The alternator (13) generates electricity. It moves with electric motors fixed to the wheels, such as the recently fashionable electric cars. Or it drives a machine in the classical way. Whichever is suitable is decided in the project design.

In this system, the steam turbine (9) operates by expanding from ambient temperature to approximately −100° C. The outgoing R134a refrigerant enters the condenser (5). Thus, the circuit is completed.

Thermal efficiency is shown $$\eta_{thermal} = 1 - \frac{T_{exhaust}}{T_{input}} \qquad \text{(Formula III)}$$

in Carnot cycle.

$$\eta_{thermal} = 1 - \frac{273.15 - 100}{273.15 + 40} \rightarrow \eta_{thermal} = 44.707\% \qquad \text{(Formula IV)}$$

It is a theoretical efficiency. It is for a reversible state. If we compare it with otto and diesel, it is a very good result. It is also the work obtained without using any fuel. Under normal conditions, the efficiency of auto and diesel cycles is 35%.

Figure 3:
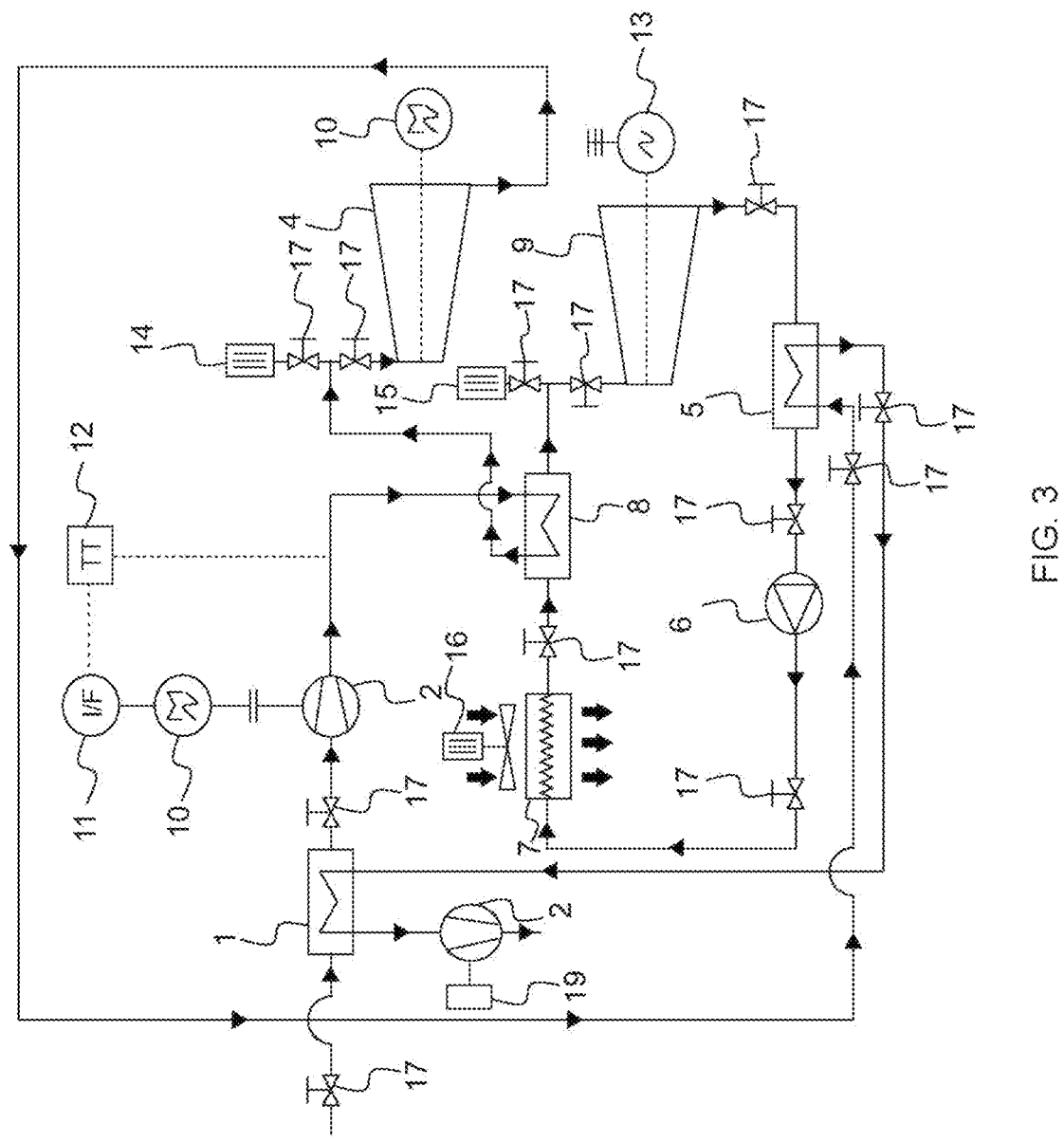
FIG. 3: The subject of the invention is the schematic view of the use of the turbo machine in aircraft.
Figure 4:
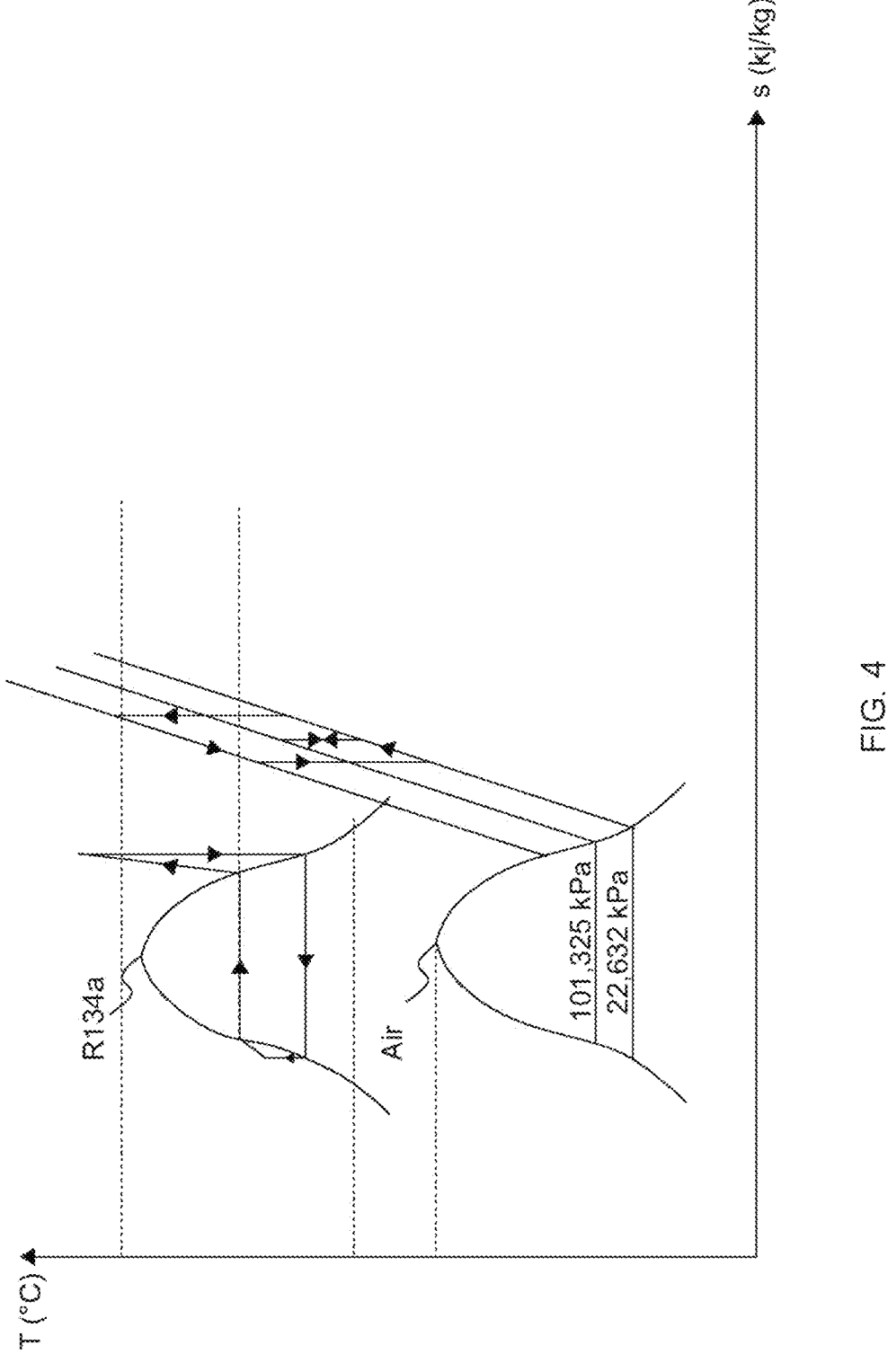
FIG. 4: The subject of the invention is the view of the entropy-temperature graph of the use of the turbo machine in aircraft.

In a different embodiment of the system according to the invention, where the system according to the invention is used in aircraft, a heater II (8) is added to the system, which is connected to the heater I (7) and heats the fluid. In this case, the steam turbine (9) connected to the heater I (7) is connected to the heater II (8) and enables the pressurised air coming from the heater II (8) to perform work. In addition, a compressor (2) connected to the heat exchanger (1) and a control system (19) that adjusts the current and frequency values by sensing the pressure are added to the system. (FIG. 3)

Normally the clouds are high up. The pressure is lower than sea level pressure. Since the exhaust pressure is approximately 1 atmosphere, the exhaust air is distributed in the distributors. Due to the very cold coolant passing through the pipe, water particles are formed on the pipe surfaces in the honeycomb as atmospheric air passes through heater I (7) and heater II (8). At velocities above v=5 m/s, these particles are dragged and discharged by the flowing air. So that the water particles do not freeze and lock the cooler core. Since it can make rain, hail and snow, the speed of the aircraft or helicopter should be decided by meteorologists. The ability to make it rain, which is one of the objects of the invention in question, provides a solution against drought in summer.

The aircrafts operate both on the ground and in the air. It lands at the first operate and at the end. In this case the exhaust varies between 22.625 kPa and 101.325 kPa. Therefore, the outlet pressure of the gas turbine (4) is taken as 22.625 kPa. It operates at this head for about 99% of the operating time. More work is taken from the gas turbine (4). In order to provide this system, the control system (19) is added to the compressor (2), which regulates the pressure and provides frequency current control.

Figure 5:
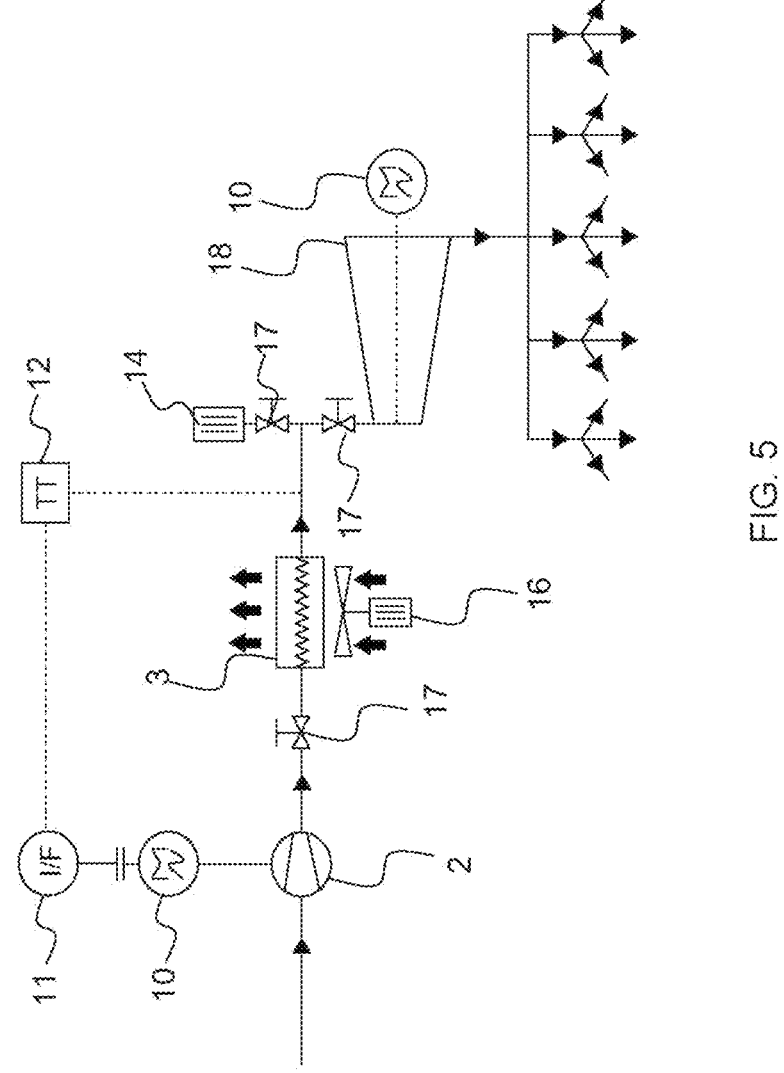
FIG. 5: In another embodiment of the invention, a schematic view of a rain-making process.
Figure 6:
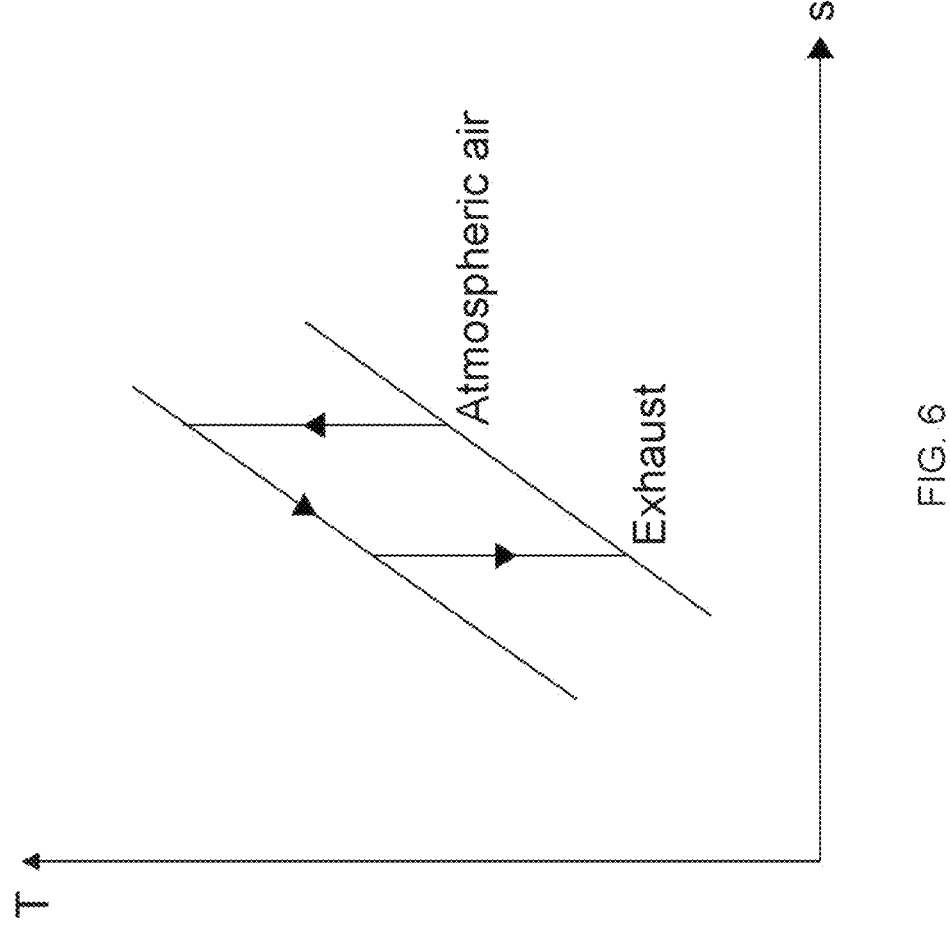
FIG. 6: In another embodiment of the invention, the view of the entropy-temperature graph of the rain-making process.

In a different embodiment of the subject of the invention turbo machine, the air sucked from the atmosphere is compressed by means of a compressor (2). The outlet air is cooled by means of a fan (16) mounted under the helicopter or aeroplane and entrained upwards. If a pilot is used, the room is heated. Otherwise, it is directed up the sides of the airplane. Outside the distributor coil is fixed under the vehicle. The work of the compressor (2) is performed by turbine III (18). Insufficient energy is supplied by the energy taken from the airplane. The airplane or helicopter manoeuvres back and forth in front of the clouds to cool them. They make it rain, snow and hail. In the different embodiment of the subject of the invention turbo machine, the hot air blown from the bottom of the aircraft, for example, is blown hotter through the heater I (7). In this way, more work is done and energy loss is less. (FIG. 5)

All battery-powered vehicles have to wait for 8 hours for recharging after charging and their life span is 2-3 years. In the turbo machine, the life span is estimated to be 25 years. It can also fulfil the three purposes described above at no additional cost.

The advantages obtained with the developed turbo machine are listed below.

The machine zeroises the damage caused by fossil fuels to nature and living things. Since it operates with the temperature of the air in the atmosphere, there is no fuel tank and also fresh air is provided from the exhaust.

The air is cooled by the heater and can prevent drought.

The turbo machine subject to the invention can be used as a drive engine in cars, minibuses, buses, vans, trucks and lorries on land. At sea; it can be used as a propulsion engine in ships and submarines.

There are about 8 parts in the inventive turbo machine. It is impossible to place all of these parts in the front of land vehicles. As in electric vehicles, it is placed at the front and bottom of the vehicle. Before this assembly work, a platform is built on the chassis. All devices are assembled on the platform. It is then covered with the body. The body is tilted sideways or forwards with the help of hinges. After the repair and maintenance process is finished, the body is brought to its place and tightened. This assembly and disassembly process is carried out with the help of forklift or crane.

7

8

What is claimed is:

1. A turbo machine, wherein the turbo machine is operated by a temperature of atmospheric air and does not require combustion of fuel, and the turbo machine comprises:

a heat exchanger, wherein the heat exchanger is located in the turbo machine and provides cooling of the atmospheric air, a compressor connected to the heat exchanger, wherein the compressor allows the cooled atmospheric air to be compressed to a pressure of 15 bar, a gas turbine connected to a tube and allowing the compressed atmospheric air to perform work, a condenser receiving exhaust air from the gas turbine and condensing refrigerant R134a, a pump connected to the condenser and configured to increase a pressure of liquid R134a coming out of the condenser, a heater for heating the liquid R134a coming out of the pump to ambient atmospheric temperature, a steam turbine connected to the heater and allowing the heated and pressurized refrigerant R134a from the heater to perform work, and an electric motor connected to the gas turbine and configured to compensate for losses of the compressor and losses of the gas turbine.

2. The turbo machine according to claim 1, further comprising a current frequency changer connected to the electric motor and configured to prevent the compressor from overheating.

3. The turbo machine according to claim 2, further comprising a transmitter connected to the current frequency changer and configured to allow a current value to be adjusted.

4. The turbo machine according to claim 1, further comprising an alternator connected to the steam turbine for generating energy.

5. The turbo machine according to claim 1, further comprising a ventilator connected to the heater and configured to blow air over the heater to heat the liquid R134a.

6. A method of operating the turbo machine according to claim 1, comprising:

cooling the atmospheric air by the heat exchanger, compressing the cooled atmospheric air by the compressor to a pressure of 15 bar, transmitting the compressed and heated atmospheric air to the gas turbine, transmitting exhaust air from the gas turbine to the condenser, compressing the liquid R134a coming out of the condenser with the pump, heating the liquid R134a coming out of the pump to ambient atmospheric temperature by the heater, and allowing the heated and pressurised refrigerant R134a to enter the steam turbine and perform work by expanding.

7. The method according to claim 6, wherein the liquid R134a coming out of the condenser is compressed by the pump up to a pressure of 4000 kPa.

* * * * *